Sept. 19, 1933.   H. H. HELMERS   1,927,567
APPARATUS FOR FORMING HOG TROUGHS
Filed Oct. 12, 1931   2 Sheets-Sheet 1
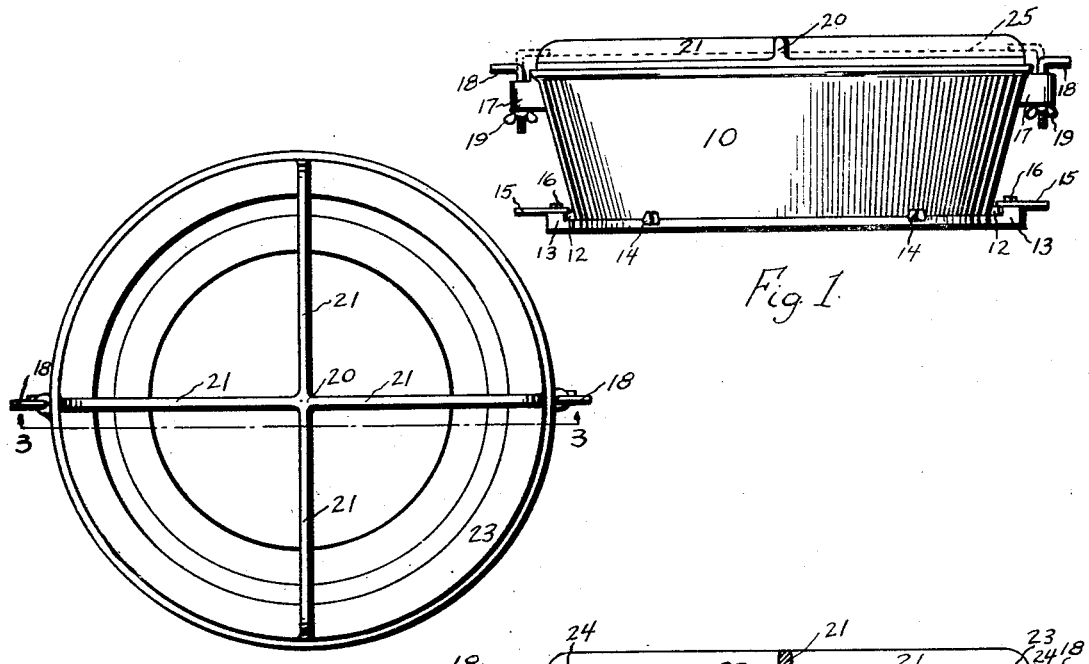
Fig. 2
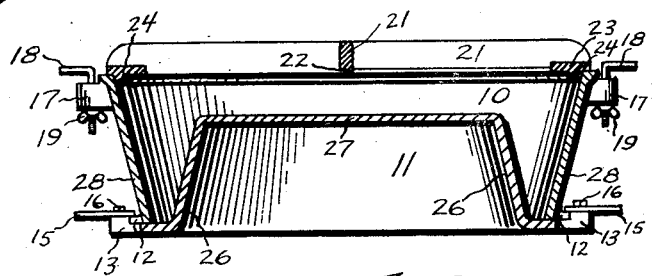
Fig. 3
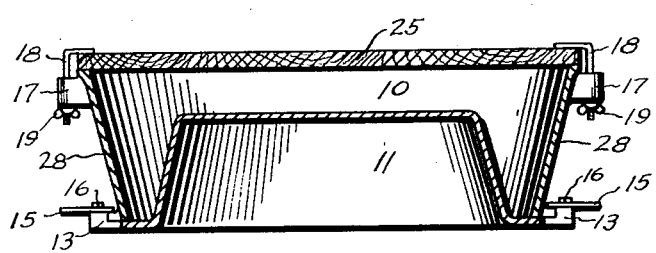
Fig. 4
Inventor
Henry H. Helmers
By Lynn H. Latta
Attorney Inventor
Henry H. Helmers
Lynn H. Latta
By
Attorney Patented Sept. 19, 1933

1,927,567

UNITED STATES PATENT OFFICE 1,927,567

APPARATUS FOR FORMING HOG TROUGHS

Henry H. Helmers, Doon, Iowa

Application October 12, 1931. Serial No. 568,291

1 Claim. (Cl. 25—130)

This invention relates to a moulding apparatus and a method for using the same when used on hog troughs of substantially circular form.

An object of my invention is to provide a simple mould that will enable anyone comparatively unskilled in the art to make a suitable hog trough.

Another object of my invention is the provision of a mould for making hog troughs so that these troughs can be made in a minimum of time.

Another object of my invention is to provide such a mould that practically any plastic substance, such as concrete or others, can be used to make such a trough.

A further object of my invention is to provide such a trough which will result in a cheaper product than the metal type.

A still further object of my invention is to provide an apparatus for making hog troughs which will result in a smoother finished product.

Another object of my invention is to provide a mould for hog troughs which is simple, durable, and easy to manufacture.

With these and other objects in view, my invention consists in the construction, arrangement, and combination of the various parts of my device whereby the objects contemplated are attained, as hereinafter more fully set forth, pointed out in my claim, and illustrated in the accompanying drawings, in which:

Figure 1 is a view of a side elevation of the mould,

Figure 2 is a plan view of Figure 1,

Figure 3 is a sectional view of Figure 2, taken substantially along the line 3—3, Figure 4 is a sectional view of the same showing the wooden base attached, and Figures 5 to 15 inclusive, illustrate the process of forming moulds with the apparatus, hereinafter described.

Figure 5:
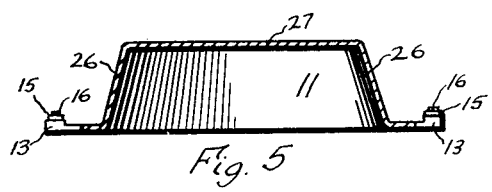

I have used the reference character 10 to indicate the outer shell of the mould. This outer shell is provided with the ears 12. The inner core 11 is provided with the flanges 13 and the guide projections 14.

The levers 15 are suitably mounted on the flanges 13 and swing about the bolt or pin 16.

The upper part of the shell 10 includes the lugs 17, which lugs receive the bent arms 18 which are adjusted for clamping purposes by the thumb nut 19.

I have further provided the frame 20 which includes the four arms 21 at right angles to each other. These arms 21 include the beveled portion 22 at their lower portions. The outer rim 23 of the frame includes the beveled portion 24.

I further provide the wooden base 25 which is used when the trough is drying.

It will be seen that in the core 11, the side walls 26 converge toward the top 27 as illustrated in Figure 3, while the side walls 28 of the outer shell diverge upwardly.

It will now be necessary to explain the operation of the device, in making the troughs.

Figure 6:
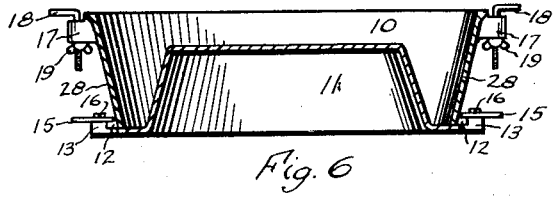

Figure 5 illustrates the beginning operation where the core 11 is placed as shown. In this position, the levers 15 are substantially tangential to the outer periphery of the core 11. The outer shell 10 is next placed upon the core 11 as shown in Figure 6, and the locking levers 15 swung about until they cover the ears 12.

Figure 7:
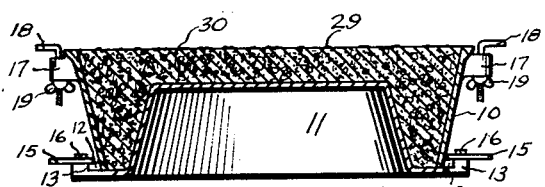
Figure 8:
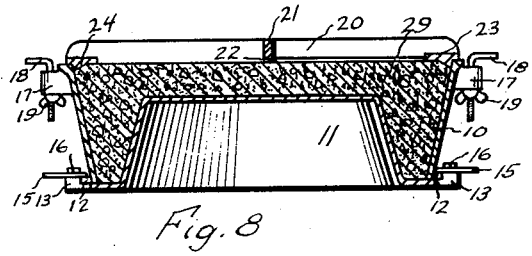
Figure 9:
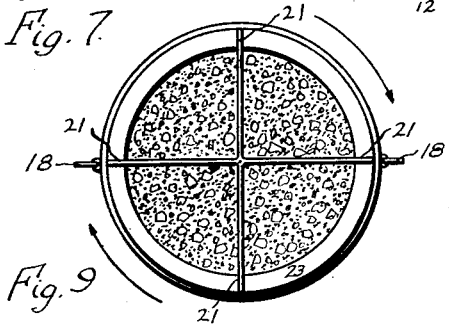

Next, the concrete or other plastic material, which we will designate by the character 29, is poured into and between the core 11 and the shell 10, as indicated by Figure 7. In this position, the upper surface 30 of this plastic material will be rather rough and it will be necessary to smooth it down somewhat. I accomplish this by the use of the frame 20, and as illustrated in Figure 8. This frame 20 is placed so that it fits fairly snugly within the shell 10 and by applying a slight pressure on the frame and turning in the direction of the arrows as shown in Figure 9, I effect the result of smoothing down the surface 30 of the trough, and at the same time forming the slight beveled portion 31, by means of the beveled portion 24 in the frame. This smoothing action is very satisfactorily achieved by means of the bevel portion 22 of the arms 21, since it will be seen that the direction of travel of this bevel portion is such that the lower and pointed end of the bevel is toward the rear of the travel of the arm and tends to smooth out all fine particles in the plastic material so that when the frame 20 is removed, the upper surface of the mould is smoothed down very satisfactorily, and the bevel portion 31 is formed.

Figure 10:
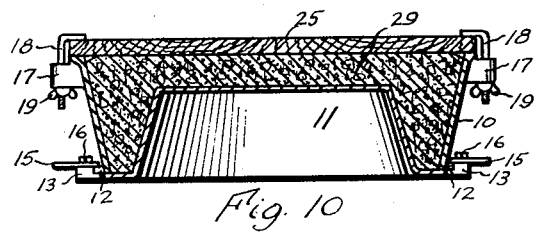

Next, I place the wooden base 25 upon the upper surface of the trough and swing the arms 18 about and lock them down against the base by means of the adjusting thumb screw 19, which is shown in Figure 10.

Figure 11:
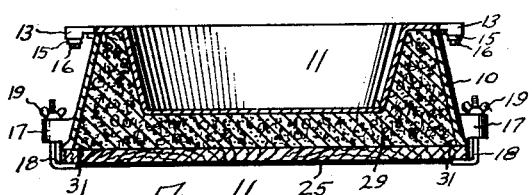
Figure 12:
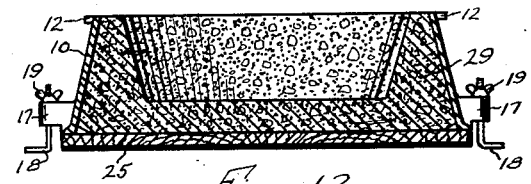

Next, as in Figure 11, I reverse the mould and swing the locking levers 15 outwardly into their tangential relation to the periphery of the core. The core 11 is then pulled out as in Figure 12, which shows this core removed.

Figure 13:
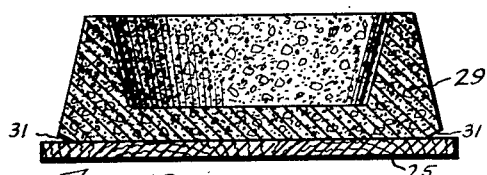
Figure 14:
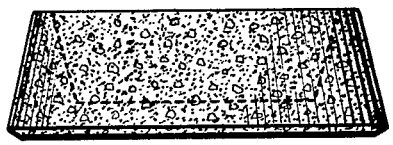

Next the shell 10 is pulled off, leaving the still plastic substance in the shape as shown in Figure 13, and on the wooden base 25. This material is then allowed to dry and harden, leaving the finished trough as indicated by the side elevation as in Figure 14.

It will be understood through this process that what I have termed the "top portions" of the trough eventually result in the lower portions and vice versa, since most of the operation must be performed on a reversed trough.

Figure 15:
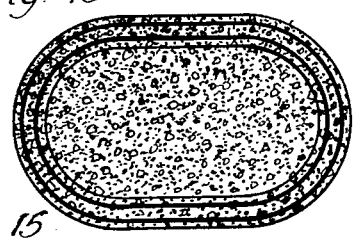

Figure 15 indicates generally a top view of another form of mould which can be formed by this same process.

It will be understood that my invention can be used for forming any kind of trough of like nature, using a plastic material.

It will be seen that I have provided a mould which will make troughs simply and readily.

Further, it will be seen that my method of making troughs results in a superior finished article of much better appearance than other troughs of like nature. Furthermore, it will be observed that a great number of troughs can be made with the same mould in continuous operations. Also, the mould is simple and easy to manufacture.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A mould for forming hog troughs comprising an inner core having upwardly converging walls, an outer shell having downwardly converging walls, locking means between the core and the shell, a spider frame supported on the upper periphery of the outer shell and adapted to rotate thereon, said frame having an annular bevelled edge and including a plurality of arms having bevelled edges arranged to smooth a plastic substance when rotated.

HENRY H. HELMERS.